March 28, 1961 N. W. SCHUBRING ET AL 2,977,544

DIFFERENTIATING CIRCUIT

Filed Oct. 28, 1957 2 Sheets-Sheet 1

INVENTORS
Norman W. Schubring, &
BY Merle E. Fitch
E.W. Christen
ATTORNEY

INVENTORS
Norman W. Schubring, &
Merle E. Fitch
BY E. W. Christen
ATTORNEY

United States Patent Office 2,977,544

Patented Mar. 28, 1961

2,977,544

DIFFERENTIATING CIRCUIT

Norman W. Schubring, Hazel Park, and Merle E. Fitch, Dearborn, Mich., assignors to General Motors Corporation, Detroit, Mich., a corporation of Delaware Filed Oct. 28, 1957, Ser. No. 692,693

2 Claims. (Cl. 328—127)

This invention relates to electronic differentiating circuits and more particularly to an improvement in such circuits utilizing regenerative feedback.

In many electronic systems it is necessary to provide an output signal which accurately represents the first time derivative of an input signal. A commonly used elementary differentiating circuit takes the form of a series connection of resistor and condenser wherein the input voltage is applied across the combination and the output voltage is taken across the resistor. This elementary circuit develops an output voltage which is an approximate time derivative since the current through a condenser is directly proportional to the product of the capacitance and the time rate of change of voltage across the condenser. However, the voltage across the condenser differs from the applied voltage by the value of the voltage across the resistor. Therefore, the output voltage is not a mathematically perfect time derivative of the input voltage. To minimize this error, numerous schemes have been devised some of which utilize elaborate circuits including either regenerative or degenerative feedback to cause the circuit to behave as though the resistive component were negligibly small. Such prior art circuits, however, have introduced other deleterious effects into the system which limit the useful application of such circuits.

In accordance with this invention there is provided a differentiator which utilizes regenerative feedback and is capable of mathematically perfect differentiation for input signals having a wide dynamic amplitude range over a wide frequency spectrum. This is accomplished by providing regenerative feedback in such manner that the input signal and output signal are mixed at a high impedance level. This prevents interstage loading and is preferably accomplished by grid modulation of the electron stream of the input signal amplifier. Since the circuit elements of any circuit are subject to spurious frequency responses because of stray or distributed inductance or capacitance, operation over a wide frequency spectrum necessitates some form of compensation. This invention provides such compensation as a function of frequency without disturbing other response characteristics of the circuit. This compensation is accomplished by combining a portion of the input signal voltage directly with the output signal voltage. This compensating circuitry preferably takes the form of a feedback circuit from the output impedance to a control or screen grid in the input signal amplifier.

It is also desirable in a differentiating circuit to develop the time rate of change voltage without phase inversion. Obviously, this eliminates the need for a succeeding or additional stage for inverting the time rate of change voltage before utilization. This is accomplished in the present invention by utilizing an impedance in the phase inverting stage of the feedback circuit for developing both the feedback voltage and the resultant output voltage.

A more complete understanding of this invention may be had from the detailed description which follows taken with the accompanying drawings in which.

Before considering the inventive circuit, it will be helpful to consider the mathematical relationships involved in the process of differentiation. A differentiating circuit may be evaluated by analyzing the response of the circuit to each frequency in the desired spectrum. Accordingly, the frequency components of a given input signal may be considered individually and represented by $$e_{in}=E \sin wt \quad (1)$$

where $w=2\pi f$ $f$=frequency $E$=maximum instantaneous voltage.

Since the desired output voltage is the first derivative with respect to time of the input voltage, the expression for the desired output voltage is $$e_{out}=wE \cos wt \quad (2)$$

This expression shows that each frequency component of the input signal is advanced 90 degrees leading in phase and has an amplitude directly proportional to its frequency.

Figure 4:
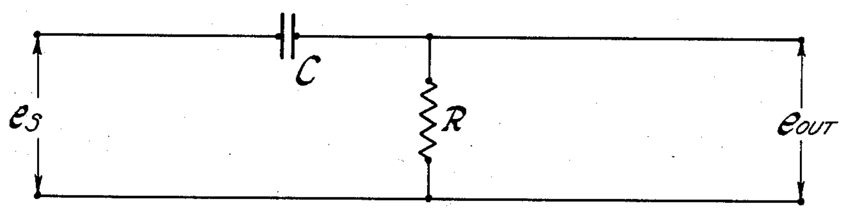
Figure 4 is a schematic diagram of an elementary differentiating circuit with a regenerative feedback signal.

An elementary differentiating circuit of the four terminal resistor condenser type is illustrated in Figure 4. Since this is one type of differentiating circuit for which the inventive circuit is adapted it will be helpful to consider its differentiating action. With an input signal voltage $e_{in}=e_s$, the transfer function may be written $$\frac{e_{out}}{e_{in}}=\frac{e_{out}}{e_s}=\frac{jwRC}{jwRC+1} \quad (3)$$

wherein the factor $j$ is a unit vector at 90 degrees. By inspection of this equation, it is apparent that a departure from mathematical differentiation is occasioned by the presence of the term $jw$RC in the denominator. If the denominator were reduced to unity, the output voltage would be directly proportional to frequency and at 90 degrees leading. To utilize this elementary differentiating circuit for obtaining pure differentiation, it is therefore necessary to eliminate the effect of this term on the output voltage.

For this purpose, consider the same elementary differentiating circuit as shown in Figure 4 when the applied or input voltage $e_{in}$ is the summation of $e_s$ and $e_{out}$. The transfer function is $$\frac{e_{in}}{e_{out}}=\frac{e_s+e_{out}}{e_{out}}=\frac{R+\frac{1}{jwC}}{R} \quad (4)$$

which may be simplified to $$\frac{e_{out}}{e_s}=jwRC \quad (5)$$

This Equation 5 shows that mathematically perfect differentiation is realized at all frequencies by this elementary differentiating circuit when the output voltage is added to the input signal voltage.

Figure 1:
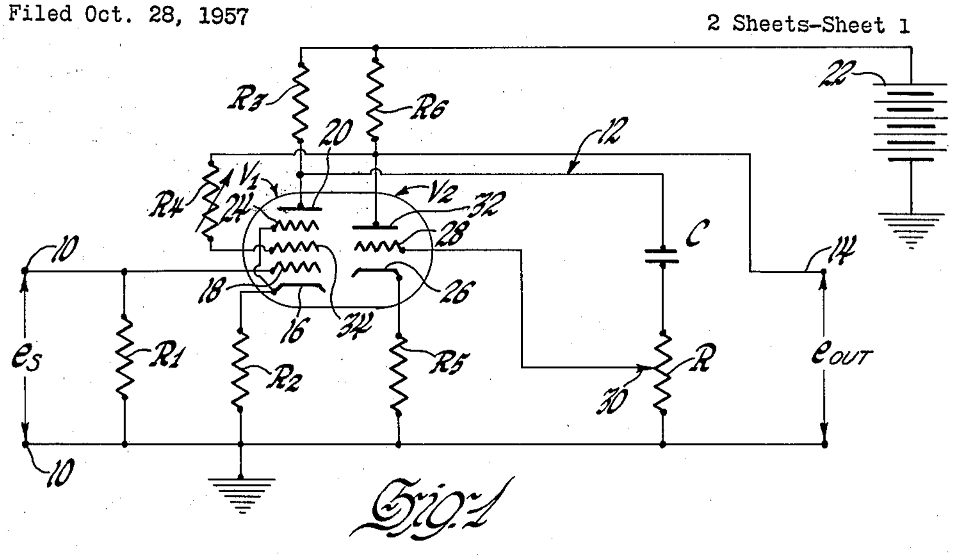
Figure 1 is a schematic diagram of the differentiator.

The electronic differentiator shown in Figure 1 incorporates this principle of regenerative feedback as an illustrative embodiment of the present invention. The differentiator comprises, in general, an amplifying device V1 having input terminals 10 and having an output circuit which is coupled to an elementary differentiating circuit 12. A feedback circuit including a phase inverting, amplifying device V2 is connected to a control grid of the amplifying device V1. The output voltage corresponding to the mathematically perfect first time derivative of the input voltage is developed across the output terminals 14.

The input signal $e_s$ is applied across the terminals 10 and the input circuit resistor R1. The input circuit of the amplifying device V1 extends from the cathode 16 through the cathode resistor R2 and thence through the resistor R1 to the control grid 18. The output circuit of the amplifying device V1 extends from the plate 20 through the plate load resistor R3 to one terminal of the supply voltage source 22 which has its other terminal connected to a point of reference potential or ground. The output circuit is completed from ground through the cathode resistor R2 to the cathode 16. The suppressor 24 is connected directly to the cathode 16. An elementary differentiating circuit 12 is connected across the load resistor R3 and comprises a condenser C and potentiometer resistor R in series connection. The phase inverting, amplifying device V2 has an input circuit extending between the cathode 26 and control grid 28 which includes the cathode circuit resistor R5 and an adjustable portion of potentiometer resistor R determined by the position of the movable tap 30. The output circuit of the amplifying device V2 extends from the plate 32 through the plate load resistor R6 to one terminal of the supply voltage source 22 and thence through ground and cathode resistor R5 to cathode 26. The output voltage developed across plate load resistor R6 of the amplifying device V2 is applied through the variable resistor R4 to the screen grid 34 of amplifying device V1. The output voltage corresponding to the time rate of change of the input voltage is developed across the resistor R6 and output terminals 14.

The amplifying devices V1 and V2 are suitably combined in a single envelope in the form of a pentode-triode vacuum tube. A vacuum tube type 6U8, presently available from the Radio Corporation of America, has been found very satisfactory in a circuit utilizing the following component values, expressed in ohms and microfarads. R1=100K; R2=220; R3=15K; R4=680K; R5=56; R6=4.1K; R=61K and C=0.002 $\mu f$. As will appear hereinafter, the pentode type tube with a screen grid adapted to draw screen grid current, is utilized in controlling the behavior of the differentiator. In certain applications where such control is unnecessary a different tube type may be utilized which affords two control grids which do not draw grid current. Such a tube is a dual control or gate tube such as the 6AS6 currently available from the Radio Corporation of America.

Figure 2:
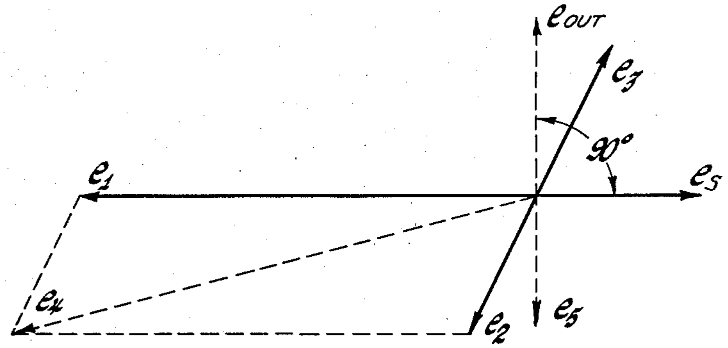
Figure 2 is a vector diagram showing the phase relation of the various voltages in the differentiator.

The operation of the inventive electronic differentiator will be explained with reference to Figures 1 and 2. The input signal voltage, applied to the terminals 10, is represented by the vector $e_s$ which is taken as the reference vector at zero degrees. This voltage, applied to the input circuit of amplifying device V1, after phase inversion and amplification thereby, appears across resistor R3 as represented by the vector $e_1$. This voltage $e_1$ is applied across the elementary differentiating circuit 12 and is imperfectly differentiated producing a voltage on the potentiometer resistor tap 30 which is represented by the vector $e_2$. Since $e_2$ is an imperfect derivative of $e_1$ it leads $e_1$ in phase by somewhat less than 90 degrees. This voltage $e_2$ is applied to the input circuit of the device V2 and is phase inverted thereby across the resistor R6 as represented by the vector $e_3$. This voltage $e_3$ is applied through R4 to the screen grid 24 of amplifying device V1 causing screen grid modulation and hence mixing, at a high impedance level, of the voltages $e_3$ and $e_s$ in the electron stream of amplifying device V1. Accordingly, the voltage $e_3$ appears across the resistor R3 with phase inversion and thus coincides in phase with the voltage $e_2$. Accordingly, the voltages $e_1$ and $e_2$ developed across resistor R3 add vectorially to produce the resultant voltage vector $e_4$. This voltage $e_4$ is the resultant voltage which is applied across the differentiating circuit 12 and by cumulative action the process just described is repeated until the voltage $e_5$ developed across resistor R falls at 270 degrees. This voltage $e_5$ is applied by tap 30 to the input circuit of amplifying device V2 and is thereby phase inverted across resistor R6. Thus the voltage $e_{out}$ taken across resistor R6 is utilized as the output voltage and occurs at 90 degrees. Accordingly, the output voltage $e_{out}$ leads the input signal voltage $e_s$ by 90 degrees satisfying the condition for mathematically perfect differentiation.

Figure 6:
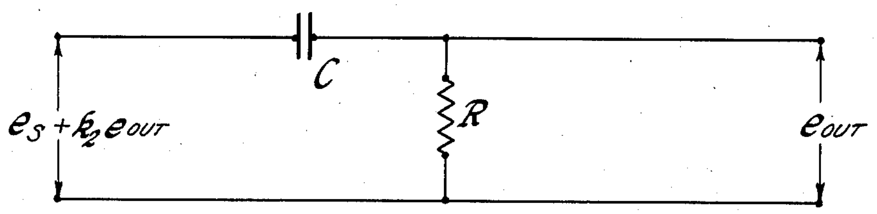
Figure 6 is a schematic diagram of an elementary differentiating circuit with a predetermined regenerative feedback factor.

To consider the effect of more or less regenerative feedback on the differentiating characteristics of the circuit, reference is made to the elementary differentiating circuit of Figure 6. In this circuit, the voltage applied to the input terminals is the summation of $e_s$ and a fractional part of $e_{out}$ or $k_2e_{out}$, where $k_2$ is the feedback factor. The transfer function for this circuit is $$\frac{e_{in}}{e_{out}}=\frac{e_s+k_2e_{out}}{e_{out}}=\frac{R+\frac{1}{jwC}}{R} \qquad (6)$$

Re-arranging terms of Equation 6 yields the expression $$\frac{e_{out}}{e_s}=\frac{jwRC}{1+jwRC(1-k_2)} \qquad (7)$$

In order to derive from Equation 7 the phase angle of the transfer function, both numerator and denominator are multiplied by the conjugate of the denominator yielding a complex expression in rectangular form as follows:

$$\frac{e_{out}}{e_s}=\frac{w^2R^2C^2(1-k_2)+jwRC}{1+w^2R^2C^2(1-k_2)^2} \qquad (8)$$

By inspection of this Equation 8 it is apparent that the phase angle $\phi$ is $$\phi=\arctan\frac{1}{wRC(1-k_2)} \qquad (9)$$

Figure 7:
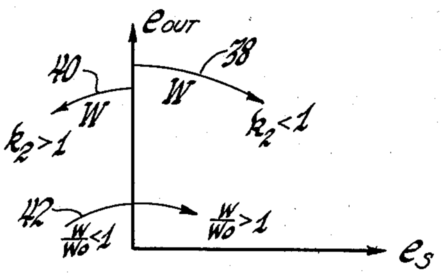
Figure 7 is a vector diagram illustrating the phase relationship between input and output voltages under conditions of varying regenerative feedback and frequency.

It is apparent from Equation 9 and it is illustrated in Figure 7 that the phase angle $\phi$ is 90 degrees leading at all frequencies when the feedback factor $k_2$ is unity. It is also noted that for a feedback factor less than unity, as indicated by arrow 38, the phase shift varies from 90 degrees leading to zero degrees as the frequency increases but for a feedback factor greater than unity, as indicated by arrow 40, the phase shift varies from 90 degrees leading to 180 degrees leading as frequency increases.

The analysis of the circuit has thus far proceeded on the assumption that the circuit components are ideal. However, it is recognized that this cannot be attained in practice and unavoidably the circuit will be subject to distributed or stray capacitance and inductance. These reactive components will introduce frequency response variations causing unwanted phase shift dependent upon the frequency of operation. Where a dual control or gate tube is employed for the amplifying device V1, compensation for such unwanted phase shift may be effected by apppropriate adjustment of the feedback factor as determined by the position of the tap 30 on potentiometer resistor R. Thus, the output voltage will be caused to correspond accurately with the time rate of change of the input voltage.

Figure 5:
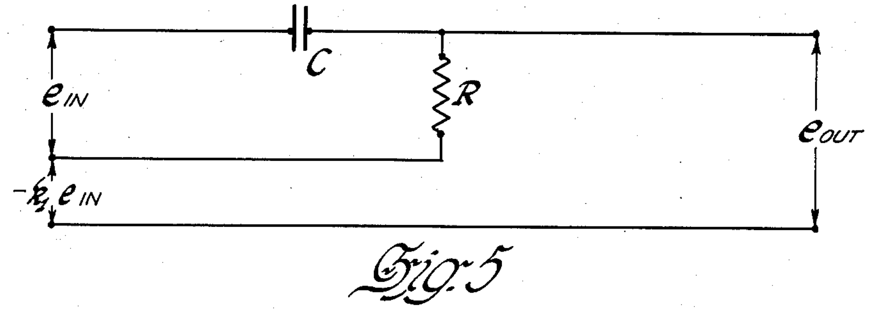
Figure 5 is a schematic diagram of an elementary differentiating circuit with a portion of the input voltage combined directly with the output voltage.

A further compensating action may be introduced into this circuit by combining a selected portion of the input voltage directly with the output voltage. This is accomplished by utilizing the flow of screen grid current when a pentode tube such as the 6U8 is employed. The effect of adding a portion of the input voltage to the output voltage in an elementary differentiating circuit will be explained with reference to Figure 5. In this circuit $$e_{out}=e_R-k_1e_s \qquad (10)$$

where $e_R$=voltage across resistor R, and
$k_1$=a fraction.

The transfer function for this circuit is $$\frac{e_{out}}{e_s}=\frac{jwRC}{jwRC+1}-k_1 \qquad (11)$$

This equation may be rationalized and, after imposing the condition of 90 degrees phase shift for perfect differentiation, may be solved for $k_1$.

$$k_1=\frac{w^2R^2C^2}{w^2R^2C^2+1} \qquad (12)$$

It is apparent from Equation 12 that $k_1$ is a function of frequency and that for a given value of R and C the desired 90 degrees phase shift can be achieved at only one frequency. This phase shift is found to vary as the ratio $w/w_0$, where $w$ is the selected frequency and $w_0$ is the frequency for 90 degrees phase shift. As the ratio of $w/w_0$ varies from zero to infinity, the phase angle varies from 180 degrees to zero. The phase angle falls at 90 degrees leading when this ratio is unity. This relationship is illustrated in the vector diagram of Figure 7 wherein the input voltage $e_s$ is taken as the reference vector at zero degrees. The output voltage $e_{out}$ assumes a phase position, as the ratio of $w/w_0$ is increased, as indicated by the arrow 42.

Figure 3:
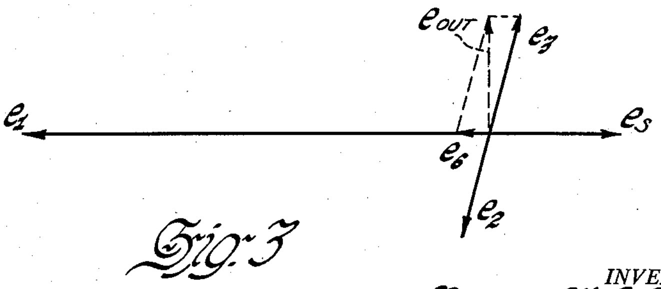
Figure 3 is a vector diagram illustrating the effect of directly combining a portion of the input signal with the output signal.

This principle of operation is incorporated in the circuit of Figure 1 by utilizing a pentode tube such as the type 6U8 in which screen grid current is permitted and operation will be explained with reference to Figures 1 and 3. The input signal voltage $e_s$ is taken as the reference vector at zero degrees. As previously described, this voltage is inverted by the amplifying device V1 and appears across resistor R3 as the voltage vector $e_1$. The input signal $e_{in}$, due to the screen grid current, is phase inverted and appears across the resistor R6 with a relative magnitude dependent upon the value of R4 which determines the equivalent internal impedances of the two stages. If resistor R4 is of relatively high value then the voltage across R6 due to screen grid current will be relatively small and is represented by the voltage vector $e_6$. As previously described, the imperfectly differentiated signal $e_2$ appearing across potentiometer resistor R is phase inverted by the amplifying device V2 and appears across R6 as the voltage vector $e_3$. These voltage components across R6, i.e. $e_3$ and $e_6$, add vectorially to produce the resultant voltage $e_{out}$. It will thus appear that if the proper amount of $e_s$ is allowed to add to the voltvoltage by 90 degrees. Accordingly, the proper adjustage $e_3$ the output voltage may be forced to lead the input voltage by 90 degrees. Accordingly, the proper adjustment of the factor $k_1$, by adjustment of the magnitude of screen grid current by the value of R4, permits compensation of the phase of the output voltage. Thus in the circuit just described the compensation of unwanted phase shift due to spurious inductance and capacitance may be accomplished by adjustment of either the potentiometer R to establish the value of the feedback factor or by adjustment of the value of R4 to establish the value of the screen grid current.

Although the invention has been described with respect to a particular embodiment, such description is not to be construed in a limiting sense. Numerous modifications and variations within the spirit and scope of the invention will now occur to those skilled in the art. For a definition of the invention, reference is made to the appended claims.

We claim:

1. An electronic differentiator comprising a first amplifying device having a cathode, anode, control grid an a screen grid, an input circuit extending between the cathode and the control grid and adapted to include an input signal voltage source, an output circuit extending between the cathode and anode and including a condenser and resistor in series, a second amplifying device having a cathode, anode and grid, an input circuit extending between the cathode and grid of the second device and including a portion of said resistor, an output circuit extending between the cathode and plate of the second device and including a load impedance for developing an output voltage, and a regenerative feedback circuit extending from the load impedance to said screen grid causing screen grid current through the impedance corresponding to the input signal voltage, whereby a portion of the input signal voltage is combined directly with the output voltage across said impedance to develop a resultant voltage corresponding to the first time derivative of the signal voltage.

2. An electronic differentiator comprising a first amplifying device having a cathode, anode, and a pair of control grids, an input circuit extending between the cathode and one control grid and adapted to include an input signal voltage source, an output circuit extending between the cathode and anode and including a condenser and resistor in series, a second amplifying device having a cathode, anode, and grid, an input circuit extending between the cathode and grid of the second device and including a portion of said resistor, an output circuit extening between the cathode and anode of the second device and including a load resistor for developing an output voltage, a regenerative feedback circuit extending from the load resistor to the other of said control grids of the first amplifying device whereby a feedback voltage and the signal voltage are mixed at high impedance level in the electron stream of the first device, said feedback circuit providing a regenerative voltage having a feedback factor of unity and said first electronic amplifying device being so designed to reduce grid current in both of said grids to a negligible value.

References Cited in the file of this patent

UNITED STATES PATENTS

| | | |
|---|---|---|
| 2,251,973 | Beal et al. | Aug. 12, 1941 |
| 2,324,797 | Norton | July 20, 1943 |
| 2,412,227 | Och et al. | Dec. 10, 1946 |
| 2,436,891 | Higinbotham | Mar. 2, 1948 |
| 2,569,321 | Liguori | Sept. 25, 1951 |
| 2,597,630 | French | May 20, 1952 |
| 2,652,490 | Levy | Sept. 15, 1953 |